(12) United States Patent
Yun et al.

(10) Patent No.: US 8,358,817 B2
(45) Date of Patent: Jan. 22, 2013

(54) SYSTEMS AND METHODS FOR FINGERPRINT MATCHING BASED ON TRANSFORMING THE DEFORMABLE MESH

(75) Inventors: Il Dong Yun, Gyeonggi-do (KR); Dong Jin Kwon, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 961 days.

(21) Appl. No.: 12/123,121

(22) Filed: May 19, 2008

(65) Prior Publication Data

US 2008/0310691 A1  Dec. 18, 2008

(30) Foreign Application Priority Data

Jun. 15, 2007 (KR) .................. 10-2007-0058760

(51) Int. Cl.
*G06K 9/00* (2006.01)
(52) U.S. Cl. ........ 382/125; 382/124; 382/115; 382/209; 382/190; 382/116; 283/72
(58) Field of Classification Search .................. None
See application file for complete search history.

(56) References Cited

U.S. PATENT DOCUMENTS

| | | | | |
|---|---|---|---|---|
| 4,310,827 A * | 1/1982 | Asai | .............................. | 382/125 |
| 5,953,442 A * | 9/1999 | Dydyk et al. | ................. | 382/125 |
| 6,330,347 B1 * | 12/2001 | Vajna | ............................ | 382/125 |
| 6,961,452 B2 * | 11/2005 | Fujii | ............................. | 382/125 |

FOREIGN PATENT DOCUMENTS

| | | |
|---|---|---|
| JP | 2002-298141 | 10/2002 |
| JP | 2005-293399 | 10/2005 |

OTHER PUBLICATIONS

Yuan, Z. et al., "Approach of Fingerprint Matching Using Cupidity Algorithm Triangulation," Computer Engineering and Applications, 2007 vol. 43, No. 10, 10 pages.*
Kwon et al. "Fingerprint Matching Method Using Minutiae Clustering and Warping," 2006, Proc. Int'l Conf. Pattern Recognition, vol. 4, pp. 525-528.*
D. Kwon, I. Yun, D. Kim, S. Lee, "Fingerprint Matching Method Using Minutiae Clustering and Warping", *2006 IEEE*.
Office Action for Chinese Application No. 200810111412.7 dated Mar. 16, 2010 (with English translation).
Yuan, Z. et al., "Approach of fingerprint matching using cupidity algorithm triangulation," Computer Engineering and Applications, vol. 43, No. 10, 2007, 10 pages (with English translation).
"Thin-plate Spline," http://en.wikipedia.org/wiki/Thin_plate_spline; Modified on Dec. 11, 2011, 4 pages.
Maio, D. et al."FVC2000: Fingerprint Verification Competition," IEEE Transactions on Pattern Analysis Machine Intelligence, 2002, pp. 402-412, vol. 24, No. 3.

(Continued)

*Primary Examiner* — Atiba O Fitzpatrick
*Assistant Examiner* — Jhere Rowland
(74) *Attorney, Agent, or Firm* — Foley & Lardner LLP

(57) ABSTRACT

A fingerprint matching system includes a first minutiae obtaining unit and a second minutiae obtaining unit adapted to obtain minutiae information of first and second fingerprints. On the minutiae of the first fingerprint, a deformable mesh is constructed by a mesh construction unit, and a mesh transformation unit is used to transform a state of the deformable mesh, thereby obtaining a distortion-compensated first fingerprint. Based on the distortion-compensated first fingerprint, a matching determination unit determines whether the first fingerprint matches the second fingerprint or not.

15 Claims, 11 Drawing Sheets

OTHER PUBLICATIONS

Pilet, J. et al., "Fast Non-Rigid Surface Detection, Registration and Realistic Augmentation," International Journal of Computer Vision, 2007, vol. 76, Issue 2, pp. 109-122.

Watson, C.I. et al., "User's Guide to NIST Fingerprint Image Software 2 (NFIS2)," National Institute of Standards and Technology, 2004, 211 pages.

* cited by examiner

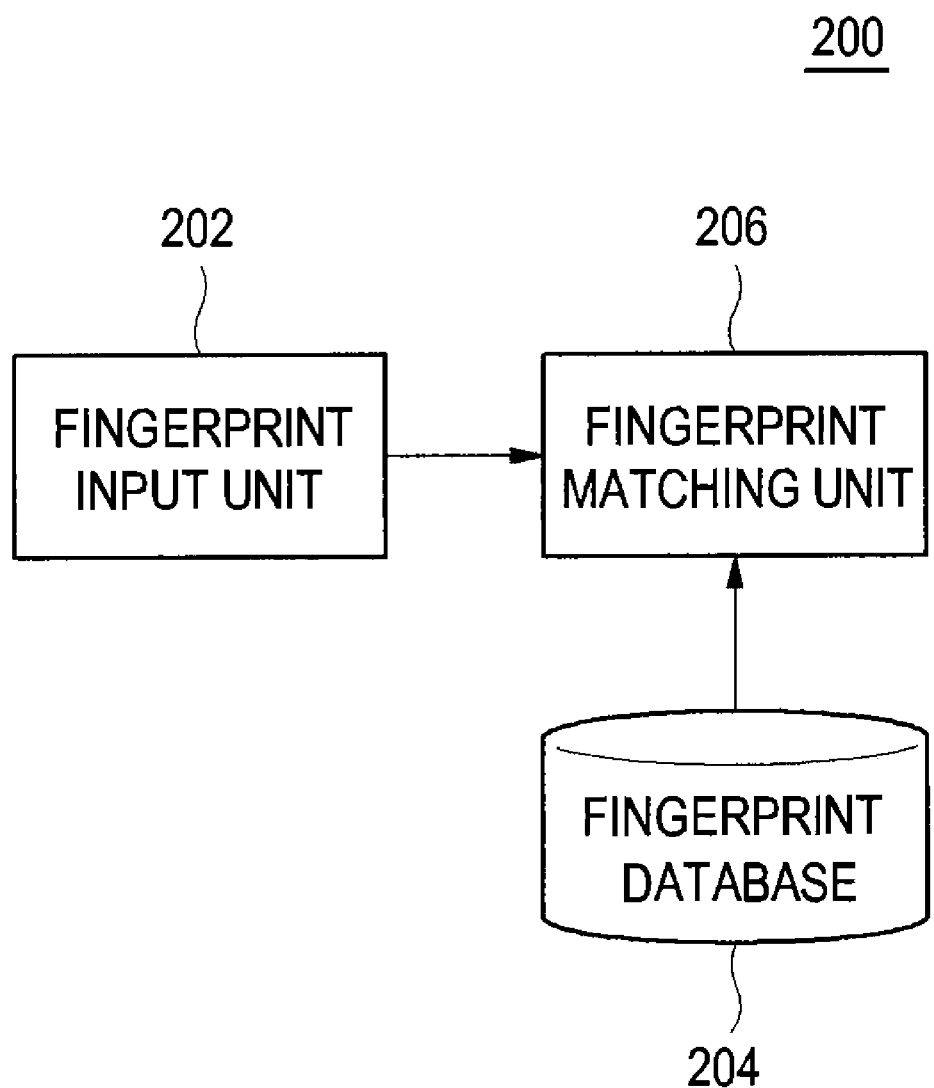

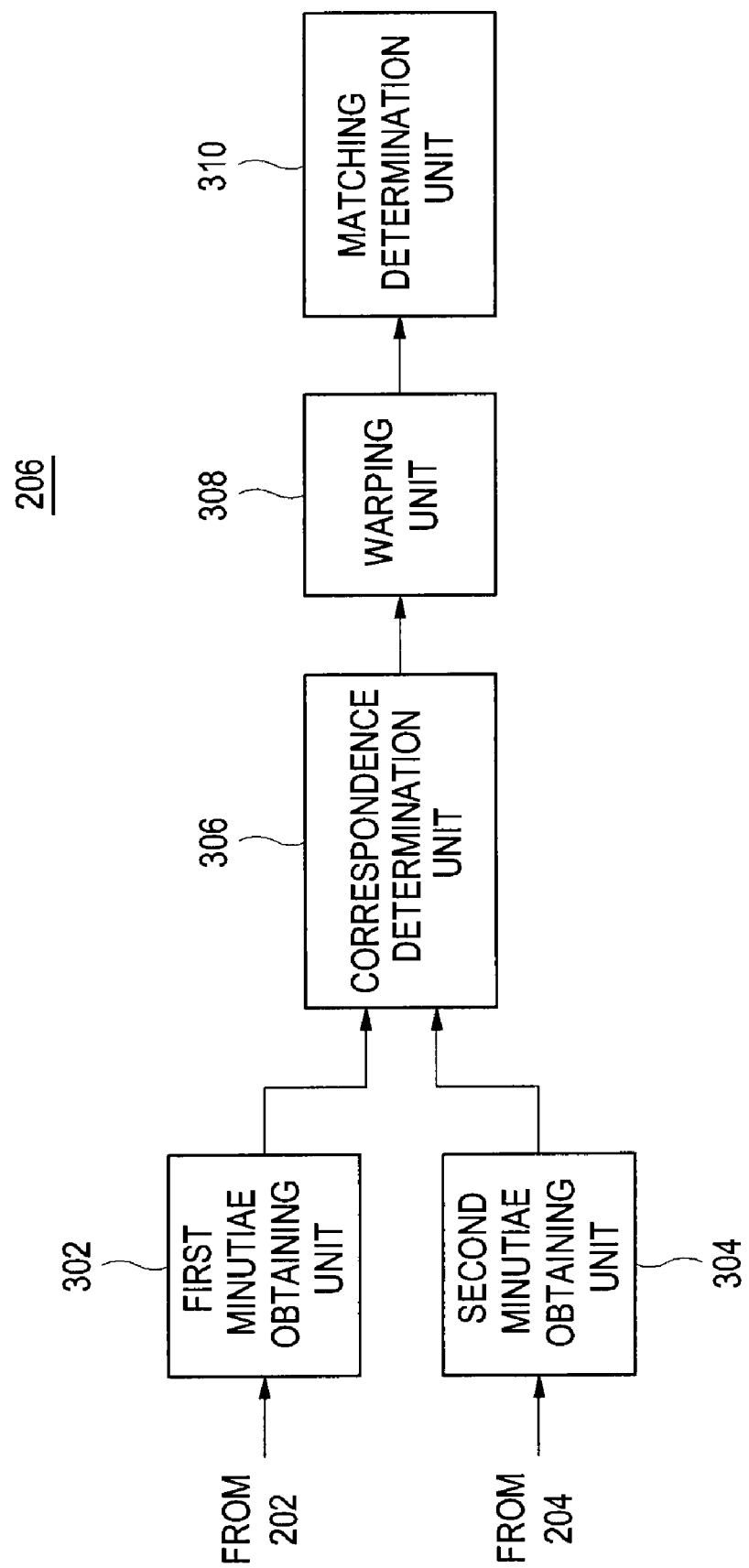

FIG. 7A

1:    $i = 0$      ▷ $\mathbf{v}$ represents $(v_x, v_y)$ for some matrix $\mathbf{v}$.
2:    $k = 0$
3:    $\mathbf{r} = (-\partial E/\partial \mathbf{X}, -\partial E/\partial \mathbf{Y})$
4:    $\mathbf{s} = \mathbf{M}^{-1}\mathbf{r}$
5:    $\mathbf{d} = \mathbf{s}$
6:    $\delta^{\mathbf{new}} = \mathbf{r}^{\mathbf{T}}\mathbf{d}$
7:    $\delta^{\mathbf{0}} = \delta^{\mathbf{new}}$
8:    while $i < i_{max}$ and $\delta_x^{new} > \epsilon^2 \delta_x^0$ and $\delta_y^{new} > \epsilon^2 \delta_y^0$ do
9:      $j = 0$
10:      $\delta^{\mathbf{d}} = \mathbf{d}^{\mathbf{T}}\mathbf{d}$
11:      repeat
12:        $\alpha_x = -\frac{[\partial E/\partial \mathbf{X}]^T d_X}{d_X^T [\partial^2 E/\partial \mathbf{X}^2] d_X}$
13:        $\alpha_y = -\frac{[\partial E/\partial \mathbf{Y}]^T d_Y}{d_Y^T [\partial^2 E/\partial \mathbf{Y}^2] d_Y}$
14:        $(\mathbf{X}, \mathbf{Y}) = (\mathbf{X}, \mathbf{Y}) + \alpha \cdot \mathbf{d}$
15:        $j = j + 1$
16:      until $j < j_{max}$ and $\alpha_x^2 \delta_x^d > \epsilon^2$ and $\alpha_y^2 \delta_y^d > \epsilon^2$
17:      $\mathbf{r} = (-\partial E/\partial \mathbf{X}, -\partial E/\partial \mathbf{Y})$
18:      $\delta^{\mathbf{old}} = \delta^{\mathbf{new}}$
19:      $\delta^{\mathbf{mid}} = \mathbf{r}^{\mathbf{T}}\mathbf{s}$
20:      $\mathbf{s} = \mathbf{M}^{-1}\mathbf{r}$
21:      $\delta^{\mathbf{new}} = \mathbf{r}^{\mathbf{T}}\mathbf{s}$
22:      $\beta = (\frac{\delta_x^{new} - \delta_x^{mid}}{\delta_x^{old}}, \frac{\delta_y^{new} - \delta_y^{mid}}{\delta_y^{old}})$
23:      $k = k + 1$
24:      if $k \geq m \cdot n$ or $\beta_x \leq 0$ or $\beta_y \leq 0$ then
25:        $\mathbf{d} = \mathbf{s}$
26:        $k = 0$
27:      else
28:        $\mathbf{d} = \mathbf{s} + \beta \cdot \mathbf{d}$
29:      end if
30:      $i = i + 1$
31:    end while

FIG. 7B

1: $r = r_0$
2: while $r \geq r_e$ do
3:     Optimize $E(S, C, r)$
4:     $r = \eta r$     ▷ $\eta$ is an attenuation constant in $(0, 1)$.
5: end while

SYSTEMS AND METHODS FOR FINGERPRINT MATCHING BASED ON TRANSFORMING THE DEFORMABLE MESH

RELATED APPLICATIONS

This application claims the benefit of priority to Korean Patent Application No. 10-2007-0058760, filed Jun. 15, 2007, the contents of which are hereby incorporated by reference in its entirety.

TECHNICAL FIELD

The present disclosure relates generally to biometric technologies and, more particularly, to systems and methods for fingerprint matching.

BACKGROUND

The fingerprint is one of the most widely used physical characteristics in biometric identification and verification. Recently, fingerprint identification has become increasingly popular as a biometric technology, since it has a good balance of desirable properties in terms of performance, reliability, etc. Thus, in recent years, there has been a great deal of research and development in the field of automatic fingerprint identification systems (AFIS), systems that automatically match one or many unknown fingerprints against a database of known fingerprints. One stage of AFIS is the fingerprint matching stage, where input fingerprint data is matched with one or more template fingerprints.

Among fingerprint matching algorithms, the minutia-based approach is one of the most widely used and reliable methods. Minutiae are small details of a fingerprint, including endings and bifurcations of fingerprint ridges. FIG. 1A shows a scanned fingerprint image with minutiae, where black lines indicate fingerprint ridges. The fingerprint includes ridge endings 102 and ridge bifurcations 104. FIGS. 1B and 1C show more detailed views of ridge endings and ridge bifurcations, respectively.

Referring to FIGS. 1B and 1C, each minutia can be represented by its location (indicated by round heads 106) and orientation (indicated by line segments 108). To be compatible with the ANSI-NIST standard, the minutia based approach must use only the location and orientation information of the minutiae—such an approach also allows for utilizing already-extracted minutiae templates of other systems, while being suitable for systems with limited computing resources. When only the location and orientation information of minutiae is used, fingerprint matching can be regarded as a point pattern matching problem of finding corresponding point pairs. However, there are at least two problems with this approach. First, the matching accuracy is influenced by spurious or dropped minutia from the minutiae extraction stage resulting from any change to skin condition. The other problem is nonlinear distortions in fingerprint images, for example, due to the elasticity of the skin and/or the pressure and movement of the finger during fingerprint acquisition (on the sensor surface).

To solve the above problems, various methods have been suggested, and recently, Kwon et al. proposed a fingerprint matching scheme using minutiae clustering and warping ("Fingerprint Matching Method Using Minutiae Clustering and Warping," Proc. Int'l Conf. Pattern Recognition, volume 4, pages 525-528, 2006). The Kwon et al. method employs local neighborhood structures and the Thin-Plate Spline (TPS) model for the fingerprint matching.

However, as the TPS model basically is a surface interpolation scheme using the basis function having infinite responses, outliers or wrong correspondences between the minutiae would distort the fingerprint surface erroneously, resulting in global influences. This is the fundamental and common problem when the TPS model is used for fingerprint matching.

SUMMARY

The present disclosure describes systems and methods for fingerprint matching. In one embodiment, a system may include a first minutiae obtaining unit and a second minutiae obtaining unit to obtain minutiae information of first and second fingerprints. On the minutiae of the first fingerprint, a deformable mesh can be constructed by a mesh construction unit, and a mesh transformation unit may be used to transform a state of the deformable mesh, thereby obtaining a distortion-compensated first fingerprint. Based on the distortion-compensated first fingerprint, a matching determination unit determines whether the first fingerprint matches the second fingerprint or not.

In another embodiment, a system may include an input minutiae obtaining unit to obtain input minutiae information of an input fingerprint, and a mesh construction unit to construct a deformable mesh on the input minutiae. The system may further include a mesh transformation unit to transform a state of the deformable mesh, thereby compensating for surface distortion of the input fingerprint.

In still another embodiment, a fingerprint matching method may obtain minutiae of a first fingerprint and minutiae of a second fingerprint. The method may also find correspondences between the minutiae of the first fingerprint and the minutiae of the second fingerprint, and construct a deformable mesh on the minutiae of the first fingerprint. The method may then transform the deformable mesh to obtain a distortion-compensated first fingerprint based on the correspondences, and based on the distortion-compensated first fingerprint, determine whether the first fingerprint matches the second fingerprint or not.

BRIEF DESCRIPTION OF THE DRAWINGS

These drawings depict typical embodiments in accordance with the present disclosure and are, therefore, not to be considered limiting of its scope. The present disclosure will be described with additional specificity and detail through use of the accompanying drawings in which:

FIG. 2 shows an exemplary system for fingerprint recognition;

FIG. 3 shows one embodiment of a fingerprint matching system in accordance with the present disclosure;

FIGS. 7A and 7B show one embodiment of optimization and iteration in accordance with the present disclosure;

DETAILED DESCRIPTION

Figure 1A:
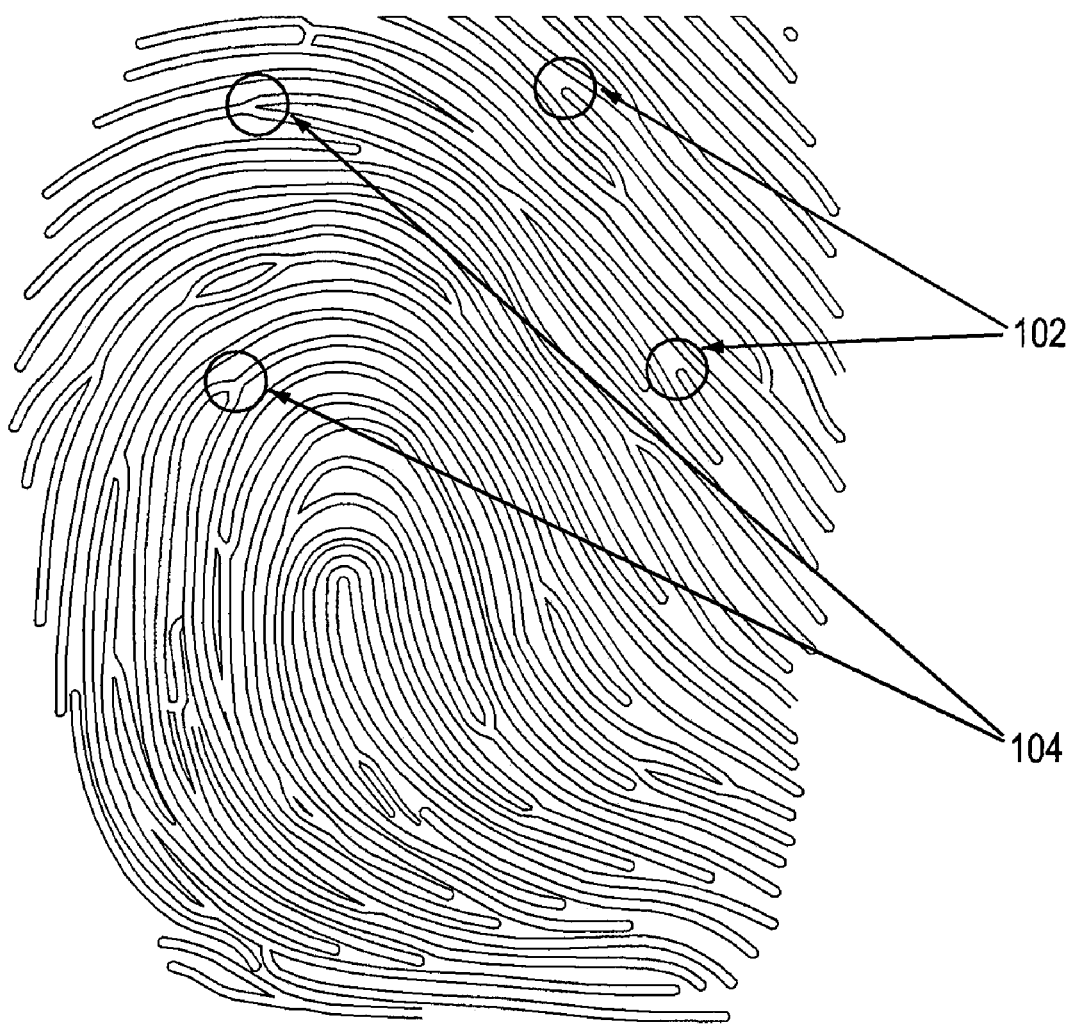
FIGS. 1A, 1B and 1C show an example fingerprint and some minutiae thereof.
Figure 1B:
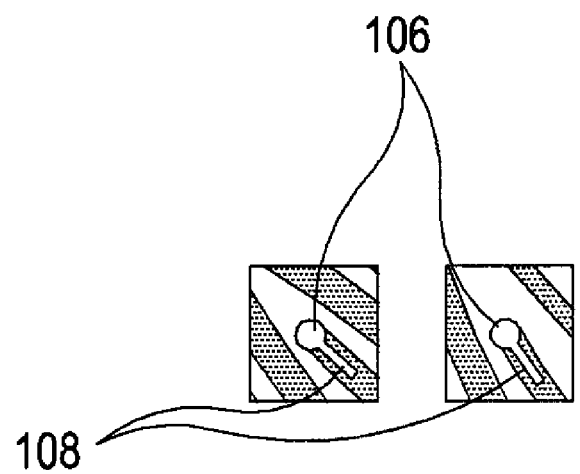
Figure 1C:
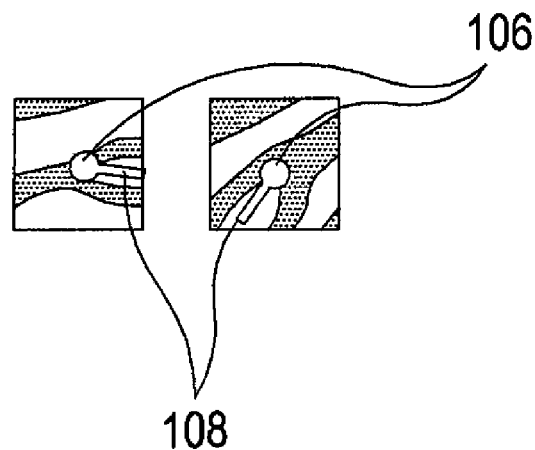

It will be readily understood that the components of the present disclosure, as generally described and illustrated in the Figures herein, could be arranged and designed in a wide variety of different configurations. Thus, the following more detailed description of the embodiments of systems and methods in accordance with the present disclosure, as represented in the Figures, is not intended to limit the scope of the present claims, but is merely representative of certain examples of presently contemplated embodiments in accordance with the present disclosure. The presently described embodiments can understood by reference to the drawings, wherein like parts are designated by like numerals throughout.

Referring to FIG. 2, one embodiment of a system 200 for fingerprint recognition is illustrated. The system 200 includes a fingerprint input unit 202, a fingerprint database 204 and a fingerprint matching system 206. The fingerprint input unit 202 may contain a generally available mechanism to obtain a fingerprint. For example, the fingerprint input unit 202 may contain an optical fingerprint scanner to scan a fingerprint. The fingerprint database 204 may store information of previously recorded fingerprints. For example, the fingerprint database 204 may store minutiae information, which includes the location and orientation of minutiae in a fingerprint. The fingerprint matching unit 206 may include a mesh-based warping unit 208.

The fingerprint matching system 206 generally receives a fingerprint from the fingerprint input unit 202, which will be referred to herein as an input fingerprint, and receives information of a previously recorded fingerprint from the fingerprint database 204, which will be referred to herein as a template fingerprint. In certain embodiments, upon receiving the input fingerprint and the template fingerprint, the fingerprint matching system 206 determines whether the input fingerprint matches the template fingerprint or not. For this purpose, the fingerprint matching system 206 may use the mesh-based warping unit 208. Further, although not illustrated, in other embodiments the fingerprint matching system 206 may be coupled with or incorporated into one or more other systems. These other systems can use the matching result from the fingerprint matching system 206 for a variety of purposes. For example, the fingerprint matching system 206 may be coupled with a computer, a lock or any other electronic devices, which operates when it is determined that the input fingerprint matches the template fingerprint.

Referring to FIG. 3, one embodiment of the fingerprint matching system 206 is illustrated. In the illustrated embodiment, the fingerprint matching system 206 includes a first minutiae obtaining unit 302, a second minutiae obtaining unit 304, a correspondence determination unit 306, a mesh-based warping unit 308 and a matching determination unit 310. The first minutiae obtaining unit 302 obtains minutiae information of a first fingerprint, which generally is the input fingerprint. For example, when the first minutiae obtaining unit 302 receives a scanned image of the input fingerprint from the fingerprint input unit 202, it uses a generally known method to extract minutiae information from the image. The minutiae information obtained by the first minutiae obtaining unit 302 will be referred to herein as first minutiae information.

The second minutiae obtaining unit 304 obtains minutiae information of a second fingerprint, which generally is the template fingerprint. For example, if the fingerprint database 204 provides minutiae information to the second minutiae obtaining unit 304, the second minutiae obtaining unit 304 can provide the received minutiae information without any modification to the correspondence determination unit 306. The minutiae information obtained by the second minutiae obtaining unit 304 will be referred to herein as second minutiae information.

The correspondence determination unit 306 generally receives the first minutiae information and the second minutiae information, and determines correspondences between the first minutiae and the second minutiae. The correspondence determination unit 306 may use any method including existing methods (e.g., such as a method using adjustable bounding box disclosed by Jain et al. ("On-line fingerprint verification", IEEE Trans. Pattern Anal. Machine Intell., 19(4):302-314, 1997) and a method using local neighborhood structures disclosed by Kwon et al. ("Fingerprint Matching Method Using Minutiae Clustering and Warping," Proc. Int'l Conf. Pattern Recognition, volume 4, pages 525-528, 2006)), to obtain the minutiae correspondences. In one embodiment, the correspondence determination unit 306 uses the local neighborhood structures in the aforementioned Kwon et al. method. In this case, the local structures are constructed using neighborhood information of the minutiae. Then, minutiae correspondences are obtained by comparing local structure information of the first minutiae and that of the second minutiae. Then, optionally, outliers can be removed by a geometric verification operation using the rigid transformation, and matched minutiae clusters can be obtained by transforming the input fingerprint from aligned location iteratively. Note that some outliers are allowable in certain embodiments of the present disclosure, and therefore in the embodiments, even correspondences without the geometric verification can be provided as the resulting minutiae correspondences.

The resulting minutiae correspondences generally include a set of minutiae pairs, each of which contains corresponding minutiae between the first minutiae and the second minutiae. In some embodiments, a minutiae correspondence can be represented as: $c=(c_0, c_1)$, where $c_0$ and $c_1$ represent locations of the corresponding minutiae in the first and second fingerprint, respectively. The output of the correspondence determination unit 208 may further include additional information. For example, in one embodiment the correspondence determination unit 208 may further determine a weight of each correspondence. The weight may vary from 0 to 1, a larger weight representing a higher reliability of the correspondence.

The mesh-based warping unit 308 generally receives the minutiae correspondences including the first and second minutiae, and performs a fingerprint surface warping operation based on the received information. By performing the surface warping, the mesh-based warping unit 308 can recover a distortion-compensated first fingerprint from the possibly distorted first fingerprint. Embodiments of the mesh-based warping unit 308 will be described later in more detail.

Based on the distortion-compensated first fingerprint, the matching determination unit 310 determines whether the first fingerprint matches the second fingerprint or not. For this purpose, the matching determination unit 310 may use any suitable matching method, including well known methods such as a global matching and scoring scheme. In one embodiment, the matching determination unit 310 may be configured to employ the global matching and scoring scheme as used in the Kwon et al. method.

Figure 4:
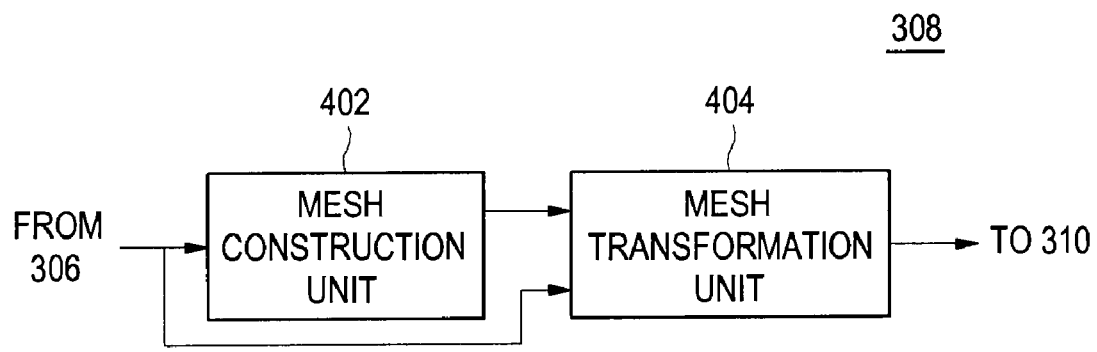
FIG. 4 shows one embodiment of a warping unit.
Figure 6A:
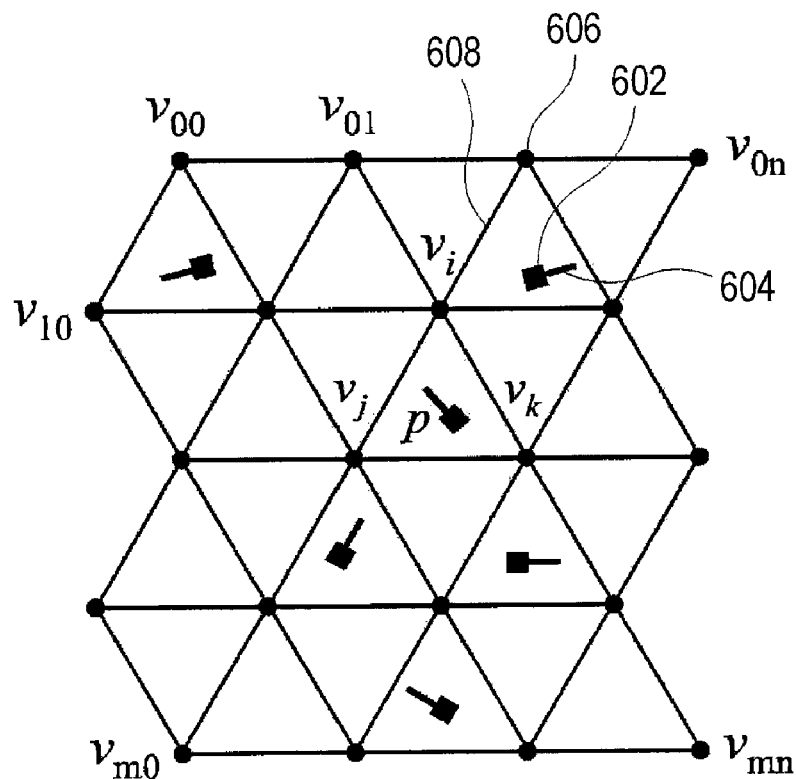
FIGS. 6A, 6B and 6C show a deformable mesh and transformation thereof.

Referring now to FIG. 4, one embodiment of the mesh-based warping unit 308 is illustrated. With reference to FIG. 4, the mesh-based warping unit 308 includes a mesh construction unit 402 and a mesh transformation unit 404. The mesh construction unit 402 constructs a deformable mesh on, for example, the first minutiae. FIG. 6A illustrates an example of the deformable mesh constructed on the first minutiae. In the example, the deformable mesh is a triangulated 2-dimensional (2-D) mesh model having hexagonally connected vertices. Referring to FIG. 6A, the square heads 602 represent locations of the minutiae contained in the first minutiae information, and the line segments 604 connected to the square heads 602 represent orientations of the minutiae. Further, the round vertices 606 and the edges 608 connecting the round vertices 606 represent the deformable mesh constructed on the first minutiae. After the deformable mesh is constructed on the first minutiae, the mesh transformation unit 404 transforms the deformable mesh constructed on the first minutiae, so that the first fingerprint surface represented by the deformable mesh approximates the second fingerprint surface, which corresponds to a fingerprint surface when the second minutiae were extracted. In other words, the transformation of the deformable mesh compensates surface distortions of the first fingerprint, thereby recovering a more accurate first fingerprint.

Figure 5:
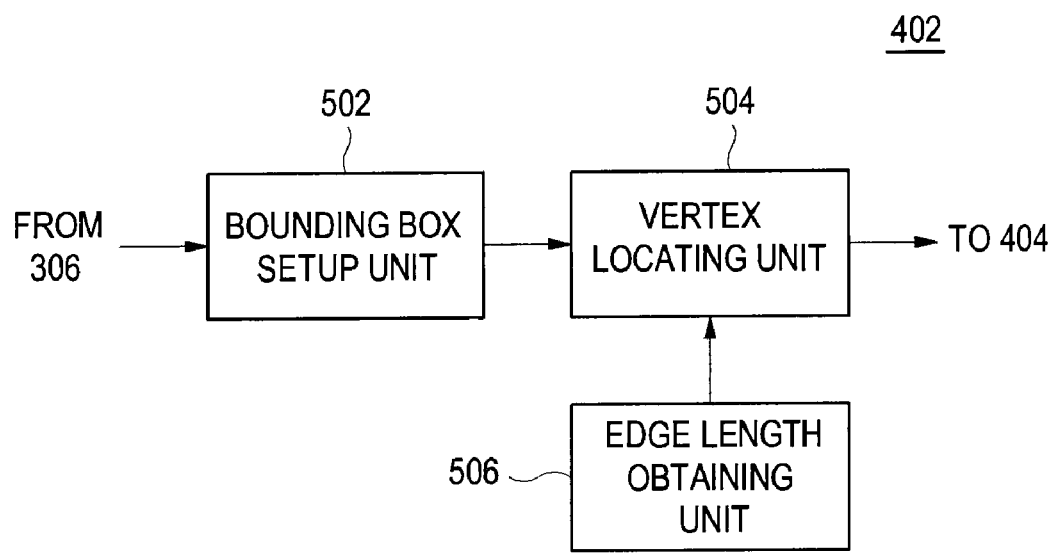
FIG. 5 shows one embodiment of a mesh construction unit.

Referring to FIG. 5, one embodiment of the mesh construction unit 402 is illustrated. In the embodiment, the mesh construction unit 402 includes a bounding box setup unit 502, a vertex locating unit 504 and an edge length obtaining unit 506. Responsive to the mesh construction unit 402 constructing a deformable mesh on the first minutiae, the bounding box setup unit 502 sets an imaginary bounding 2-dimensional box (not shown) by determining its size and position so that all of the minutiae in the first minutiae information are located in the interior of the box. Then, the vertex locating unit 504 determines locations (or x-y coordinates) of the mesh vertices 606 so that the constructed mesh covers the bounding box. In one embodiment, the locations of the mesh vertices 606 are determined based on length of the edges 608 between the mesh vertices 606. In this case, the edge length obtaining unit 506 may be used to obtain the edge length. The edge length may be hard-coded in the fingerprint matching system, or may be recorded in a rewritable storage. In the latter case, the system 200 may further include a control unit for adjustment of the edge length. Further, the edge length may be dynamically determined in the running time by the edge length obtaining unit 506. Note that the accuracy of the fingerprint matching becomes better as the edge length becomes smaller, such as, for example, as the mesh becomes denser. However, the running time of the fingerprint matching process may become longer as the edge length becomes smaller. Therefore, the edge length may be determined according to the purpose or requirements of the fingerprint matching. For example, the edge length may be chosen smaller in a case where the fingerprint matching is used to access very critical information compared to the case in which the fingerprint matching is used to access information of low consequence. Although not enumerated herein, in light of the present disclosure, those of ordinary skill in the art will appreciate that the edge length can also be determined based on a variety of other circumstances or variables.

Figure 6B:
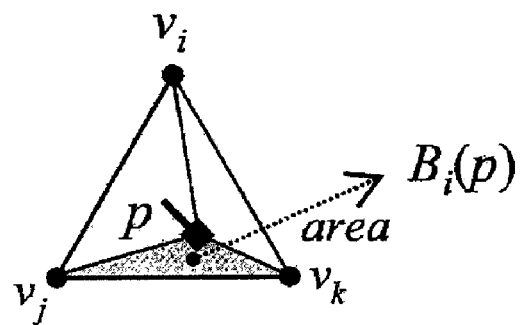
Figure 6C:
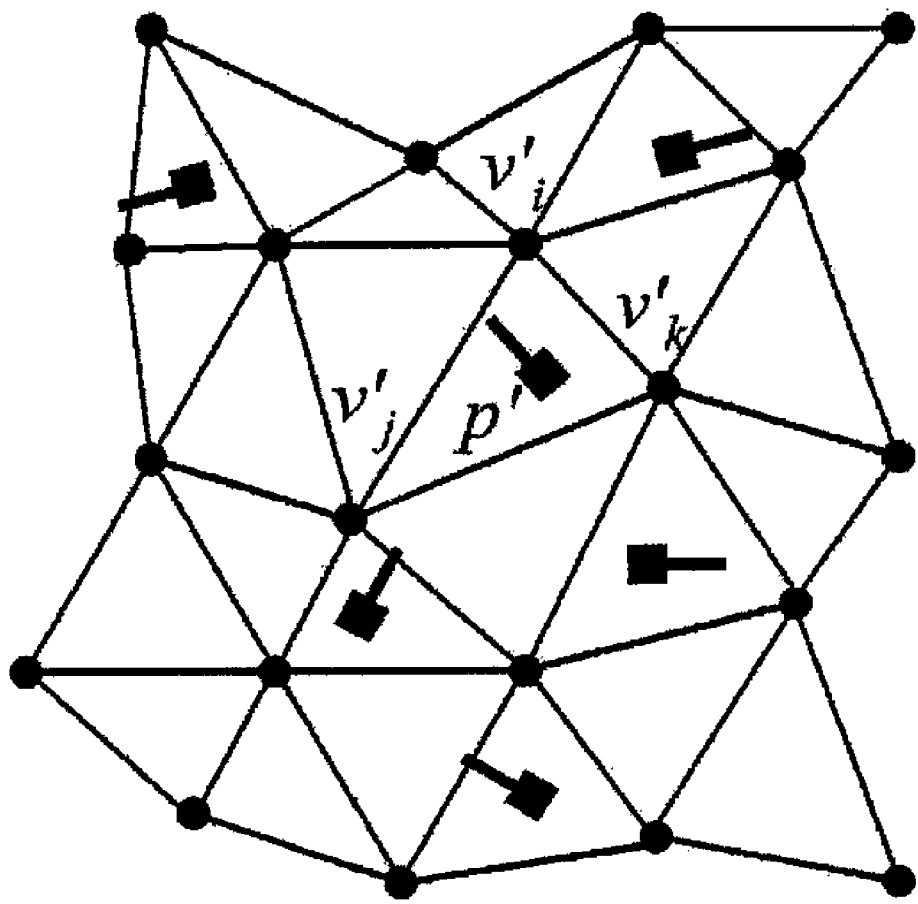

Now, one embodiment of the mesh transformation unit 404 will be described in more detail. In the embodiment, the mesh transformation unit 404 generally receives the minutiae correspondences, which include the first and second minutiae information, and the deformable mesh constructed on the first minutiae information. Then, as mentioned above, the mesh transformation unit 404 transforms the deformable mesh constructed on the first minutiae so that the first fingerprint surface represented by the deformable mesh approximates the second fingerprint surface, which corresponds to a fingerprint surface when the second minutiae were extracted. FIG. 6C shows an example of the transformed mesh. It would be appreciated that the transformation moves the mesh vertices to new locations, which constitutes a new state of the mesh. Further, as the mesh vertices move to their new locations, the minutiae surrounded by the mesh vertices also warp to new locations, which will be referred to herein as warped locations. For example, the minutia p in FIG. 6A warps to a new location p' in FIG. 6C as the vertices $v_i$, $v_j$ and $v_k$ in FIG. 6A move to new locations $v_i'$, $v_j'$ and $v_k'$ in FIG. 6C, respectively.

The warping of the minutiae will be described in more detail with reference to FIGS. 6A through 6C. Assume that the vertex $v_i$ is one of vertices of a triangle containing the minutia p. Then, the barycentric coordinates $B_i(p)$ can be calculated from the area of the sub-triangle facing $v_i$, as shown in FIG. 6B. That is, the minutia p and the vertices $v_j$ and $v_k$ are the vertices of the sub-triangle from which the barycentric coordinate $B_i(p)$ is derived. Once the barycentric coordinates for the three vertices $v_i$, $v_j$ and $v_k$ are calculated, the location $T_S(p)$ of a minutia p in a state S of mesh vertices can be represented as follows: $T_S(p)=B_i(p)v_i+B_j(p)v_j+B_k(p)v_k$. That is, when the mesh is transformed and the mesh vertices move into a new state S', the warped location of the minutia p after the transformation can be calculated using the barycentric coordinates and the new locations of the three vertices. For example, the warped location p' in FIG. 6C can be calculated as: $p'=T_{S'}(p)=B_i(p)v_i'+B_j(p)v_j'+B_k(p)v_k'$, where S' represents the transformed state of mesh vertices.

For the purpose of transformation used in this embodiment, the mesh transformation unit 404 may use an energy function. In other words, the mesh transformation unit 404 may use the energy function to determine a new state of the mesh. In one embodiment, the energy function is defined so that the energy becomes larger as the mesh deforms more, while the energy becomes smaller as the corresponding minutiae become closer. For example, for a given state S and correspondences C, the energy E can be defined as $E(S, C, r)=\lambda_D E_D(S)+E_C(S, C, r)$, where $E_D$ is a deformation energy, $E_C$ is a correspondence energy, $\lambda_D$ is a control parameter of the regularity of the mesh, and r is a confidence radius. In this case, $E_D$ is a positive value, which increases as the mesh deforms more, and $E_C$ is a negative value, whose absolute value increases as the corresponding minutiae become closer. Then, minimization of the energy will transform the mesh so that the corresponding minutiae become closer, unless the deformation of the mesh caused by the transformation overweighs the approach between the minutiae. Thus, minimization of the energy can be regarded as transforming the first fingerprint to approximate the second fingerprint.

In another embodiment, the deformation energy $E_D$ can be defined as the approximation of the sum of the squares of second derivatives of the x and y coordinates of the mesh vertices. That is, if L represents an index set of successive collinear three vertices, the deformation energy $E_D$ can be defined as:

$$E_D(S) = \frac{1}{2} \sum_{(i,j,k) \in L} (-x_i + 2x_j - x_k)^2 + (-y_i + 2y_j - y_k)^2.$$

It can also be defined as:

$$E_D(S) = \frac{1}{2}(X^T K X + Y^T K Y) \sim \int_D \left( \left\| \frac{\partial^2 T_S}{\partial x^2} \right\|^2 + \left\| \frac{\partial^2 T_S}{\partial y^2} \right\|^2 \right) dx,$$

where X and Y are row ordered matrices of x and y coordinates of mesh vertices, respectively. $E_D$ penalizes irregular spacing of vertices. K can be constructed from $K'^T K'$ where K' is a matrix containing one row per triplet in L and one column per mesh vertex. In detail, the $r^{th}$ row of K' corresponding to triplet (i,j,k) can be defined as:
$K'_{ri}=-1, K'_{rj}=2, K'_{rk}=-1, K'_{rc}=0$ for $c \neq i,j,k$. Note that the state S implies X and Y.

Further, the correspondence energy $E_C$ can be defined as:

$$E_C(S, C, r) = -\sum_{c \in C} w_c \rho(d, r).$$

In the equation, $d=\|c_1-T_S(c_0)\|$, $c_1$ is a minutiae in the second fingerprint corresponding to the minutiae $c_0$ in the first fingerprint. That is, d denotes the distance between the warped location of the minutia $c_0$ and the location of the minutia $c_1$. Further, $\omega_c$ is the weight of correspondence. If the weight of correspondence has not been determined, $\omega_c$ can be set as a constant such as 1. $\rho$ is a robust estimator. In one embodiment, the robust estimator $\rho$ can be defined as follows:

$$\rho(d, r) = \begin{cases} \frac{3(r^2 - d^2)}{4r^3} & d < r \\ 0 & \text{otherwise.} \end{cases}$$

The robust estimator has the following characteristics: if the confidence radius r is large, the weights of most correspondences will be summed in the energy; if the confidence radius r is small, the weights of only selected correspondences will be used. In light of the present disclosure those of ordinary skill in the art will appreciate that the characteristics of the robust estimator may be helpful in excluding outliers from the surface warping as the confidence radius r becomes smaller.

The mesh transformation unit 404 minimizes the energy E for a fixed confidence radius r, which can also be referred to as optimization. Pseudo code representation of one embodiment of the optimization is shown in FIG. 7A. The optimization shown in FIG. 7A uses the Newton-Raphson method for the general line search (lines 11-16), and the Polak-Ribière scheme (line 22) for quick convergence. Here, it should be noted that although FIG. 7A shows the optimization in the form of a pseudo code representation, the optimization can be implemented not only in software, but also in hardware, firmware, or the like, including combinations thereof.

In the optimization shown in FIG. 7A, the first partial derivatives of the energy function relate to direction of the transformation, which is represented as d, and the second derivatives are used to determine amount of the transformation, which is represented as α. The first and second partial derivatives can be calculated analytically, which helps efficient implementation of the optimization. For the first derivative of the x coordinate, the following equation can be used:

$$\frac{\partial E}{\partial X} = \lambda_D K X + \frac{\partial E_C}{\partial X},$$

where the derivative of the corresponding energy $E_C$ can be calculated using the equation:

$$\frac{\partial E_C}{\partial x_i} = \frac{3}{2r^3} \sum_{c \in C_i} w_c B_i(c_0)(B_i(c_0)x_i + B_j(c_0)x_j + B_k(c_0)x_k - x_{c1}),$$

where $C_i$ is a set of correspondences and $c_0$ is contained in the triangle which have $v_i$ as a vertex. Further, for the second derivative of x coordinate, the following equations can be used.

$$\frac{\partial^2 E}{\partial X^2} = \lambda_D K + \frac{\partial^2 E_C}{\partial X^2}$$

and $$\frac{\partial^2 E_C}{\partial x_j \partial x_i} = \frac{3}{2r^3} \sum_{c \in C_i} w_c B_i(c_0) B_j(c_0).$$

In the equations of the first and second derivatives, the summation is taken on the condition of d<r and $(i,j,k)=V(c_0)$ where $V(c_0)$ is a vertex index set of the triangle which contains $c_0$. The derivatives of the y coordinate can be similarly calculated. The preconditioner matrix M uses the following equation:
$M = \partial^2 E/\partial X^2 = \partial^2 E/\partial Y^2$. In one embodiment, $M^{-1}$ (lines 4, 20) can be calculated using an LU decomposition for efficiency. Further, in one embodiment, the variable $\epsilon$ (lines 8, 16) can be set to, for example, $10^{-6}$, and the loop terminating variables $i_{max}$ (line 8) and $j_{max}$ (line 16) can be fixed to small numbers.

Moreover, in some embodiments, the mesh transformation unit 404 may iterate the optimization. One embodiment of the iteration is represented as pseudo code in FIG. 7B. Referring to FIG. 7B, the confidence radius r attenuates as the optimization is repeated, until the confidence radius r becomes smaller than a predetermined threshold $r_e$. When the confidence radius r is large, $E_D$ has a larger effect than $E_C$, so the mesh deforms rigidly. However, as the confidence radius r decreases, $E_C$ becomes progressively more effective than $E_D$ and the mesh bends to the correct matches. Therefore, the effects of outliers diminish as the confidence radius r decreases. In one example, the width of the bounding box of the input minutiae may be used for $r_0$, and $r_e=0.5$, and $\eta=0.5$ may be used.

Figure 8:
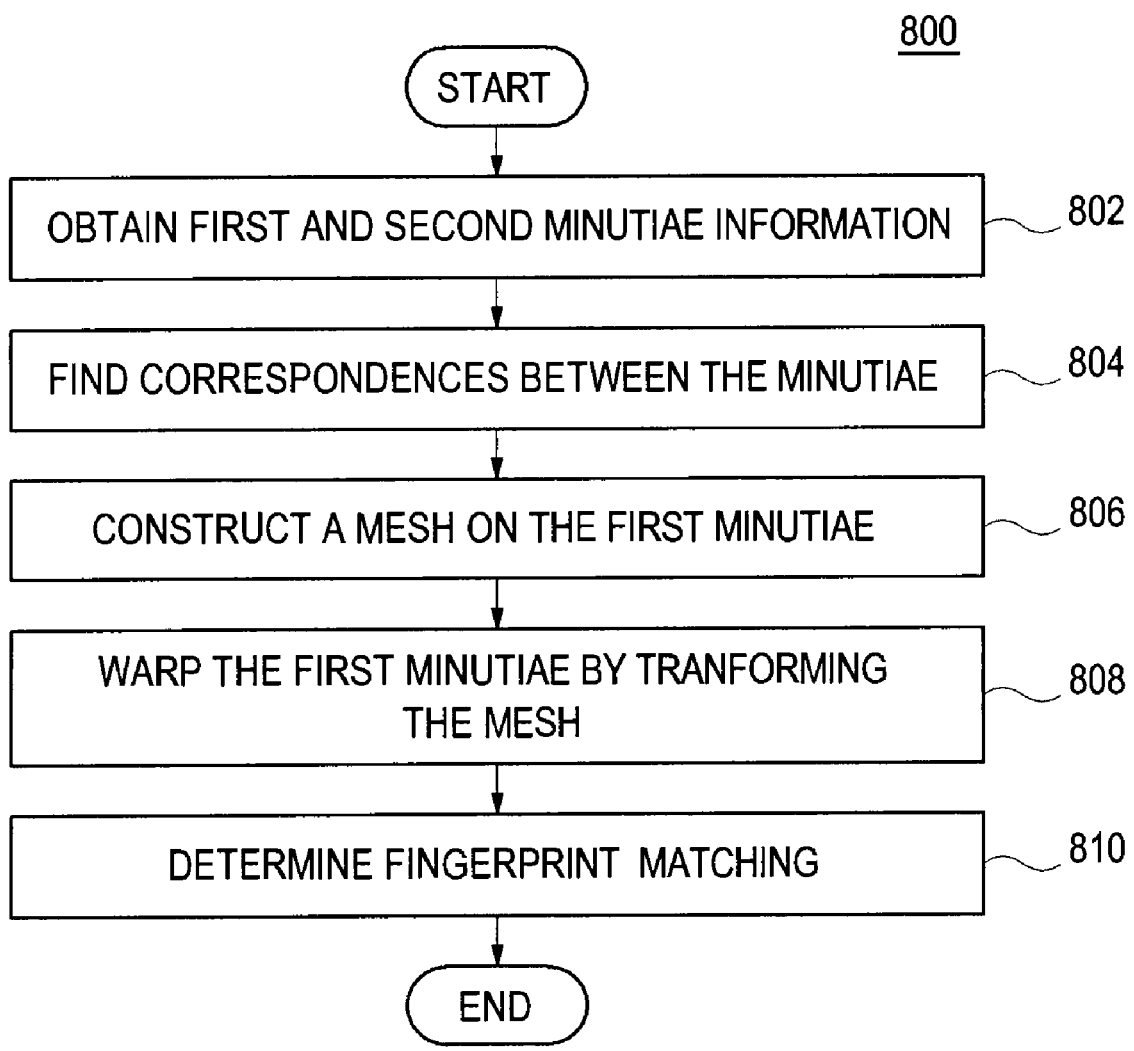
FIG. 8 shows one embodiment of a method for fingerprint matching in accordance with the present disclosure.

Referring now to FIG. 8, one embodiment of a method for fingerprint matching is illustrated. First, in the step 802, the method 800 obtains first minutiae information, which generally is minutiae information of an input fingerprint, and second minutiae information, which generally is minutiae information of a template fingerprint. Then, the method 800 finds correspondences between the first minutiae and the second minutiae in the step 804. To find the correspondences, the method 800 may use any well-known or other suitable methods. Also, the method 800 constructs a deformable mesh on the first minutiae in the step 806. In one embodiment, the deformable mesh is constructed as described above using a mesh construction unit such as, for example, the mesh construction unit 402 (FIG. 4). Then, in the step 808, the method 800 warps the first minutiae by transforming the deformable mesh constructed on the first minutiae. In one embodiment, the warping step is performed by a mesh transformation unit such as, for example, the mesh transformation unit 404 (FIG. 4). The warping step 808 can be used to compensate for surface distortion of the first fingerprint, to obtain a distortion-compensated first fingerprint, i.e., a more accurate first fingerprint. Based on the more accurate first fingerprint, the method 800 determines whether the first fingerprint matches the second fingerprint in the step 810.

Figure 9:
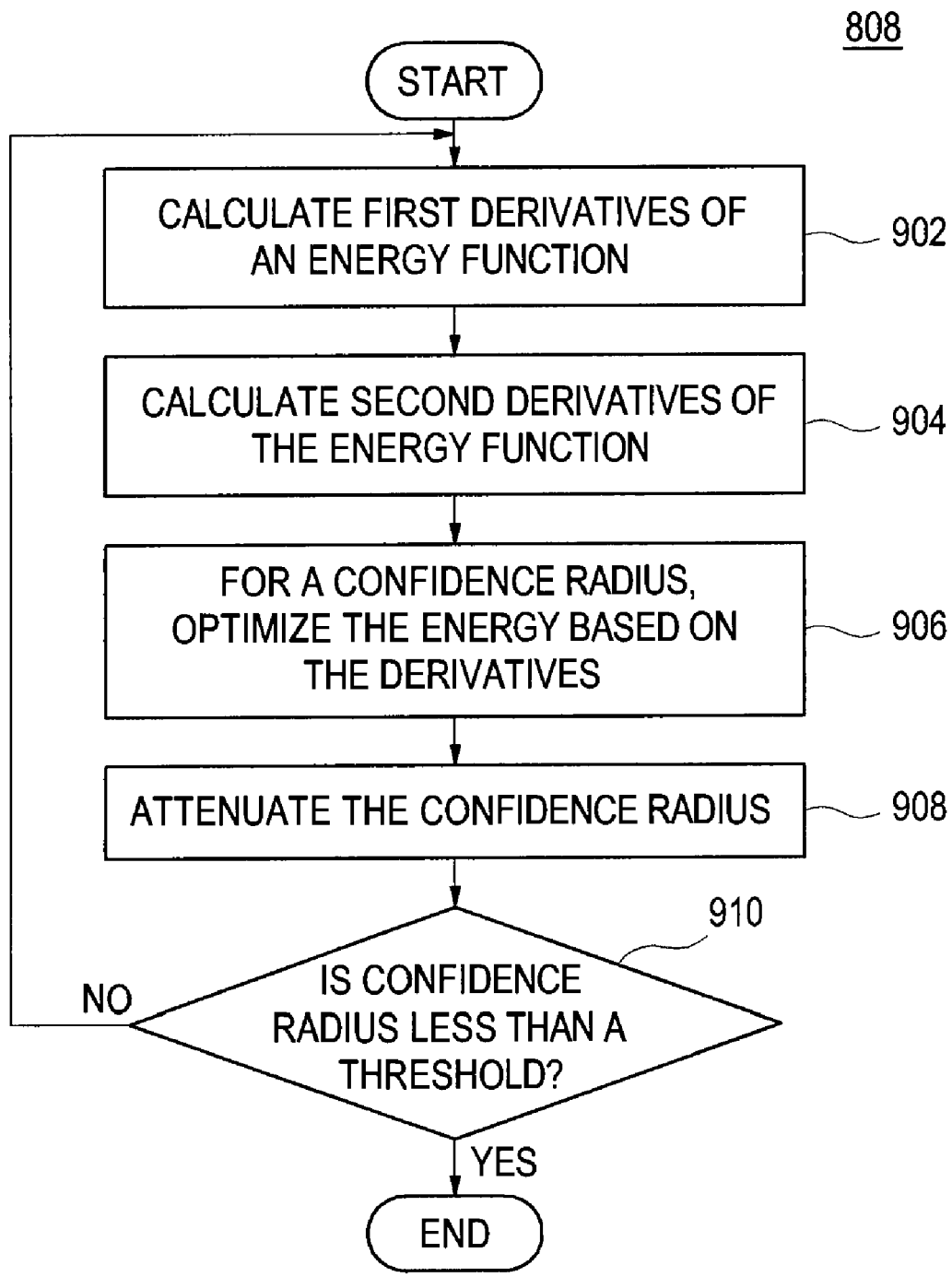
FIG. 9 shows one embodiment of a warping operation.

One embodiment of the warping operation will be described in more detail with reference to FIG. 9. The embodiment employs an energy function, details of which have been described above. First derivatives of the energy function are calculated in the step 902, and second derivatives of the energy function are calculated in the step 904. The derivatives may be calculated analytically as described above. Then, based on the first derivatives and the second derivatives, the energy defined by the energy function is optimized for a fixed confidence radius in the step 906. For example, the procedure as shown in FIG. 7A may be used to optimize the energy function. Then, the confidence radius is attenuated in the step 908. The attenuation may include, for example, multiplying a predetermined attenuation constant to the current confidence radius, without being limited thereto. The attenuated confidence radius is compared with a predetermined threshold in the step 910. If the attenuated confidence radius is greater than a predetermined threshold, the above steps are repeated with the attenuated confidence radius. By iterating the optimization with attenuating the confidence radius, the warping step 808 may diminish effects of outliers in the fingerprint matching.

Although the embodiments provided herein assume that the first fingerprint is the input fingerprint and the second fingerprint is the template fingerprint, the present disclosure is not limited thereto, but other variations are also applicable. Furthermore, although the warping unit and the warping step described herein use an energy function for the warping operation, the warping unit and the warping step may perform the warping in various other ways. Moreover, although the energy function is optimized based on the analytically calculated first and second partial derivatives in the aforementioned embodiments, in light of the present disclosure it will be appreciated by one of ordinary skill in the art that other methods or variables can also be employed additionally or alternatively.

In light of this disclosure, it should also be appreciated by one of ordinary skill in the art that the systems and methods described herein may be implemented in hardware, software, firmware, middleware, or combinations thereof and utilized in systems, subsystems, components, or sub-components thereof. For example, a method implemented in software may include computer code to perform the steps of the method. This computer code may be stored in a machine-readable medium, such as a processor readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., a processor, a computer, mobile device, media player, etc.).

The disclosed systems and methods may be embodied in other specific forms without departing from their basic features or characteristics. Thus, the described embodiments are to be considered in all respects only as illustrative, and not restrictive. The scope of the present disclosure is, therefore, indicated by the appended claims, rather than by the foregoing description. All changes within the meaning and range of equivalency of the claims are to be embraced within their scope.

The invention claimed is:

1. A fingerprint matching system comprising:
   a memory; and
   a processor operatively coupled to the memory, wherein the processor is configured to:
      obtain first minutiae information of a first fingerprint;
      obtain second minutiae information of a second fingerprint;
      construct a deformable mesh based on the first minutiae;
      transform a state of the deformable mesh, wherein the transforming is based at least in part on the second minutiae information of the second fingerprint;
      transform the deformable mesh to minimize an energy and to generate a distortion-compensated first fingerprint, wherein the energy is defined to increase according to deformation of the deformable mesh, and decrease as corresponding minutiae approach one another, wherein the processor transforms the deformable mesh as follows:
         analytically calculate first derivatives of the energy, wherein the first derivatives relate to a direction of transformation;
         analytically calculate second derivatives of the energy, wherein the second derivatives relate to an amount of the transformation; and
         transform the deformable mesh based on the first derivatives and the second derivatives; and
      determine whether the first fingerprint matches the second fingerprint based on the distortion-compensated first fingerprint.

2. The fingerprint matching system of claim 1, wherein the processor is further configured to warp the first minutiae according to the transformed state of the deformable mesh.

3. The fingerprint matching system of claim 1, wherein the processor is further configured to determine correspondences between the first minutiae and the second minutiae, and wherein the transforming is based at least in part on the correspondences.

4. The fingerprint matching system of claim 1, wherein the processor is further configured to determine locations of vertices in the deformable mesh so that the deformable mesh covers the first minutiae.

5. The fingerprint matching system of claim 4, wherein the processor is further configured to: obtain edge lengths of edges connecting the vertices; and
   determine the locations of the vertices based on the obtained edge lengths.

6. The fingerprint matching system of claim 4, wherein the state of the deformable mesh is defined based on the locations of the vertices.

7. The fingerprint matching system of claim 1, wherein the deformable mesh is a triangulated 2-dimensional mesh having hexagonally connected vertices.

8. The fingerprint matching system of claim 1, wherein the first minutiae and the second minutiae include at least one of a ridge ending and a ridge bifurcation.

9. A system for compensating surface distortion of an input fingerprint comprising:
   a memory; and
   a processor operatively coupled to the memory and configured to:
      obtain input minutiae information of an input fingerprint;
      construct a deformable mesh based on the input minutiae information; and
      transform a state of the deformable mesh to compensate surface distortion of the input fingerprint, wherein the transforming is based at least in part on template minutiae information associated with a template fingerprint;
      transform the deformable mesh to minimize an energy, wherein the energy is defined to increase according to deformation of the deformable mesh, and decrease as corresponding minutiae approach one another, and wherein the processor is configured to transform the deformable mesh to minimize the energy as follows:

analytically calculate first derivatives of the energy, wherein the first derivatives relate to a direction of transformation;

analytically calculate second derivatives of the energy, wherein the second derivatives relate to an amount of the transformation; and transform the deformable mesh based on the first derivatives and the second derivatives.

10. The system of claim 9, wherein the processor is further configured to:

obtain the template minutiae information of the template fingerprint; and determine correspondences between the input minutiae and the template minutiae, and wherein the transforming of the state is based at least in part on the correspondences.

11. A fingerprint matching method comprising:

obtaining, by a computing device, minutiae of a first fingerprint and minutiae of a second fingerprint;

finding correspondences between the minutiae of the first fingerprint and the minutiae of the second fingerprint;

constructing a deformable mesh based on the minutiae of the first fingerprint;

transforming the deformable mesh to obtain a distortion-compensated first fingerprint based on the correspondences, wherein the transforming comprises transforming the deformable mesh to minimize an energy, and wherein the energy is defined to increase according to deformation of the deformable mesh, and decrease as corresponding minutiae approach one another, wherein transforming the deformable mesh to minimize the energy comprises:

analytically calculating first derivatives of the energy, wherein the first derivatives relate to a direction of transformation;

analytically calculating second derivatives of the energy, wherein the second derivatives relate to an amount of the transformation; and transforming the deformable mesh based on the first derivatives and the second derivatives; and determining whether the first fingerprint matches the second fingerprint based on the distortion-compensated first fingerprint.

12. The fingerprint matching method of claim 11, wherein the energy disregards correspondences having a distance greater than a confidence radius, and further comprising:

attenuating the confidence radius;

determining whether the attenuated confidence radius satisfies a predetermined ending condition; and if it is determined that the attenuated confidence radius does not satisfy the predetermined ending condition, repeating the operations of transforming the deformable mesh to minimize the energy, attenuating the confidence radius, and determining whether the attenuated confidence radius satisfies the predetermined ending condition.

13. The fingerprint matching method of claim 12, wherein the predetermined ending condition is satisfied when the attenuated confidence radius is less than a predetermined threshold.

14. A fingerprint matching apparatus comprising:

means for obtaining minutiae of a first fingerprint and minutiae of a second fingerprint;

means for finding correspondences between the minutiae of the first fingerprint and the minutiae of the second fingerprint, means for constructing a deformable mesh on the minutiae of the first fingerprint;

means for transforming the deformable mesh to obtain a distortion-compensated first fingerprint based on the correspondences, wherein the means for transforming comprises means for transforming the deformable mesh to minimize an energy, and wherein the energy is defined to increase according to deformation of the deformable mesh, and decrease as corresponding minutiae approach one another, wherein the means for transforming the deformable mesh to minimize the energy comprises means for analytically calculating first derivatives of the energy, means for analytically calculating second derivatives of the energy, and means for transforming the deformable mesh based on the first derivatives and the second derivatives, wherein the first derivatives relate to a direction of transformation, and wherein the second derivatives relate to an amount of the transformation; and means for determining whether the first fingerprint matches the second fingerprint based on the distortion-compensated first fingerprint.

15. A method comprising:

obtaining, by a processor of a fingerprint matching system, first minutiae information of a first fingerprint;

obtaining, by the processor, second minutiae information of a second fingerprint;

constructing, by the processor, a deformable mesh based on the first minutiae;

transforming, by the processor, a state of the deformable mesh, wherein the transforming is based at least in part on the second minutiae information of the second fingerprint;

transforming, by the processor, the deformable mesh to minimize an energy and to generate a distortion-compensated first fingerprint, wherein the energy is defined to increase according to deformation of the deformable mesh, and decrease as corresponding minutiae approach one another, wherein the transforming comprises:

analytically calculating first derivatives of the energy, wherein the first derivatives relate to a direction of transformation;

analytically calculating second derivatives of the energy, wherein the second derivatives relate to an amount of the transformation; and transforming the deformable mesh based on the first derivatives and the second derivatives; and determining, by the processor, whether the first fingerprint matches the second fingerprint based on the distortion-compensated first fingerprint.

* * * * *